United States Patent [19]

Hodson et al.

[11] 4,398,958

[45] Aug. 16, 1983

[54] MAKING LIGHTWEIGHT CONCRETE

[75] Inventors: Ralph Hodson, Scunthorpe; Kenneth J. Davies, Romsey; Glen J. L. Brown; William L. Carroll, both of Southampton; Robert Noble, Romsey, all of England

[73] Assignee: Cempol Sales Limited, Southampton, England

[21] Appl. No.: 346,670

[22] Filed: Feb. 8, 1982

[30] Foreign Application Priority Data

Mar. 24, 1981 [GB] United Kingdom ............... 8109185

[51] Int. Cl.³ .............................................. C04B 31/44
[52] U.S. Cl. ..................................... 106/90; 106/97
[58] Field of Search .............. 106/90, 97; 428/404, 428/405

[56] References Cited

U.S. PATENT DOCUMENTS 3,764,357  10/1973  Bowles et al. .................... 106/90

Primary Examiner—James Poer
Attorney, Agent, or Firm—Sughrue, Mion, Zinn, Macpeak & Seas

[57] ABSTRACT

Lightweight concrete incorporating expanded polystyrene beads is made by first coating the expanded beads with an aqueous surfactant solution, which preferably contains a substantive cationic surfactant, e.g. a substituted or ethoxylated quaternary ammonium compound containing a $C_{10}$ to $C_{18}$ alkyl substituent or an ethoxylated primary or secondary amine having a $C_{10}$ to $C_{18}$ alkyl substituent, and a non-ionic surfactant such as an ethoxylated primary or secondary alcohol or a nonyl-phenol-ethylene oxide condensate. The wet beads are coated with dry cement and then mixed with a further supply of cement, water and sand or aggregate to complete the concrete mix.

18 Claims, 1 Drawing Figure

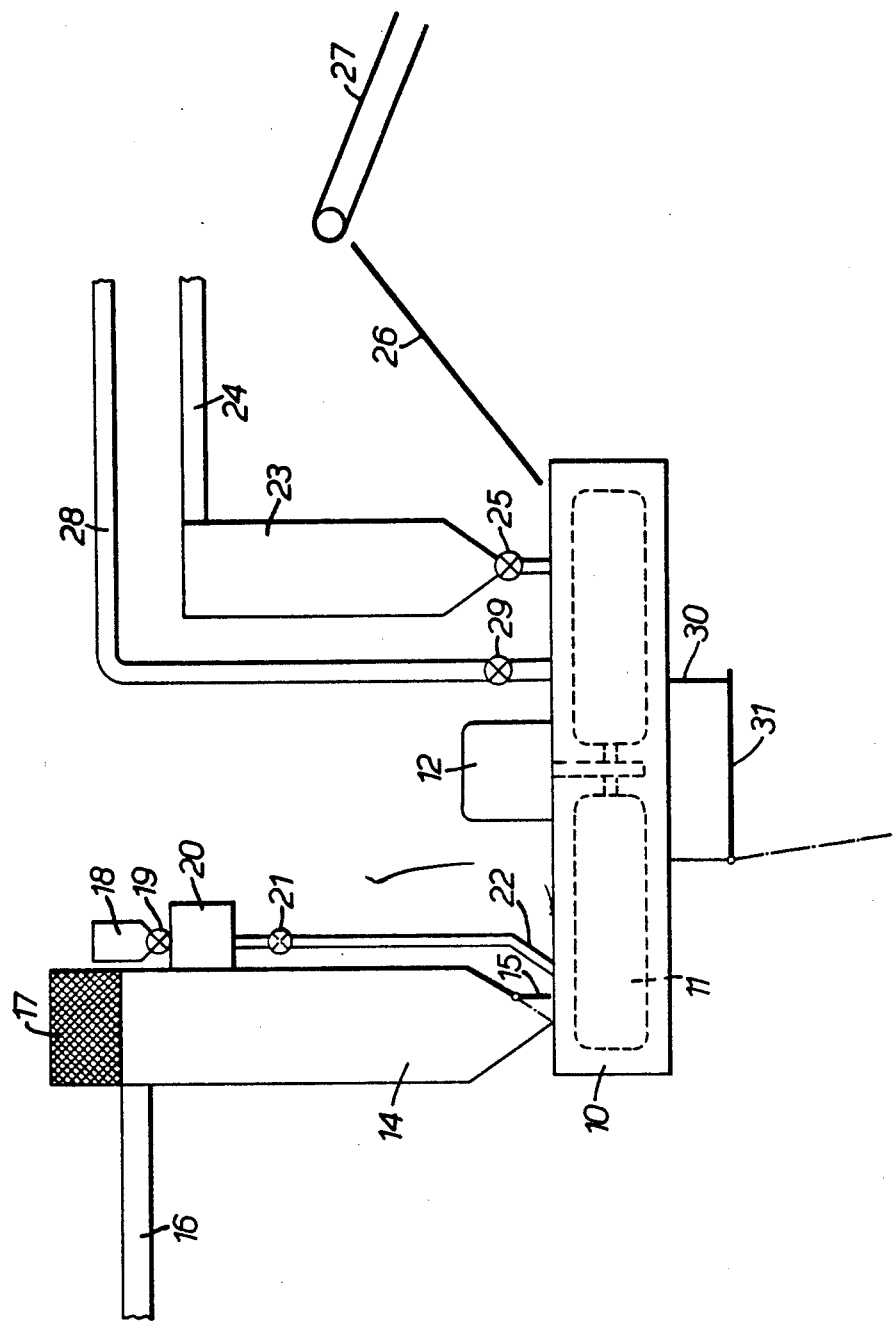

MAKING LIGHTWEIGHT CONCRETE

BACKGROUND OF THE INVENTION

1. Field of the Invention

This invention relates to methods of making lightweight concrete.

2. Description of the Prior Art

It is known to make lightweight concrete by incorporating expanded polystyrene beads in an aggregate of cement, sand and water, but difficulty has been experienced in ensuring proper distribution of the expanded polystyrene beads in the aggregate and of obtaining an effective bond between the beads and the cement.

SUMMARY OF THE INVENTION

According to the present invention, a method of making lightweight concrete comprises the steps of coating expanded polystyrene beads with an aqueous surfactant solution, coating the wet beads with dry cement, and then mixing the cement-coated beads with a further supply of cement, water and sand or aggregate to complete the concrete mix. The cement-coated beads have been found to distribute themselves relatively uniformly in the further supply of cement, water and sand or aggregate and to bond well into the cement so as to provide a strong uniform concrete.

Preferably the aqueous surfactant solution is applied to the polystyrene beads as they fall from a hopper into a mixer. The dry cement may also be applied to the wet polystyrene beads in the mixer, after completion of the application of surfactant solution. Conveniently the further supply of cement, water and sand or aggregate is introduced into the mixer after completion of the application of the dry cement to the beads. In this way, the coating and mixing processes are all carried out in the same mixer, which may be of a conventional paddle type.

The aqueous solution may contain a total of from 10 to 40% by weight of surfactant and may conveniently be applied in a proportion of from ½ to 2 liters per cubic meter of the total concrete mix. The expanded polystyrene beads may be mixed with the cement, water and sand or aggregate so as to constitute from 30 to 80% by volume of the total concrete mix, and preferably so as to constitute from 60 to 70% by volume of the total concrete mix.

Preferably the aqueous surfactant solution contains both a substantive cationic surfactant and a non-ionic surfactant.

The proportion of cationic to non-ionic surfactant in the aqueous solution is preferably between 1:1 and 6:1. The cationic surfactant is preferably a substituted or ethoxylated quaternary ammonium compound containing a $C_{10}$ to $C_{18}$ alkyl substituent. The $C_{10}$ to $C_{18}$ alkyl substituent is preferably a predominantly saturated alcohol, preferably a $C_{12}$ to $C_{14}$ alcohol.

Alternatively the cationic surfactant may be an ethoxylated primary or secondary amine having a $C_{10}$ to $C_{18}$ alkyl substituent, and the alkyl substituent is preferably a predominantly saturated $C_{12}$ to $C_{14}$ alkyl group.

The non-ionic surfactant is preferably an ethoxylated primary or secondary alcohol, or a nonylphenol-ethylene oxide condensate. The non-ionic surfactant preferably has a hydrophilic-lipophilic balance of 11 to 16.

BRIEF DESCRIPTION OF THE DRAWING

The accompanying drawing is a diagrammatic elevation of a conventional paddle-type concrete mixer provided with additional means for admitting the materials required for carrying out the method of the invention.

DETAILED DESCRIPTION OF THE INVENTION

The mixer illustrated has a casing 10 containing a paddle-type rotor 11 driven by a motor 12. A hopper 14 for supply of the expanded polystyrene beads can be put in communication with the hopper 14 through a pivoting door 15. The hopper 14 can be supplied with batches of expanded polystyrene beads entrained in an air stream through a pipe 16 and has a wire mesh top 17 to allow escape of the entraining air. Supply of the beads is controlled by an electronic level sensor (not shown) which ensures that the correct amount of beads is held in the hopper for each batch.

A header tank 18 for containing an aqueous solution of cationic and non-ionic surfactants is connected through a valve 19 to a reservoir 20 wherein the surfactant solution is diluted with water to the desired concentration. A further valve 21 and pipe 22 are arranged to supply the surfactant solution to the casing 10, so as to coat the beads entering from hopper 14.

A further hopper 23 is arranged to be supplied with batches of dry cement through a pipe 24 and to admit the batches of dry cement into the casing 10 through a valve 25.

A chute 26 is arranged to be supplied with batches of sand or aggregate by a conveyor 27 and to discharge them into the casing 10.

A water supply pipe 28 is connected to the casing 10 through a valve 29.

A discharge outlet 30 from the casing 10 is controlled by a pivoted door 31.

An electronic control system is provided to time the sequence of operations, which is commenced by the closing of the mixer discharge door 31, after discharge of the previous batch of mixed concrete. First, the bead discharge door 15 is opened to admit a measured batch of expanded polystyrene beads to the casing 10 while the rotor 11 is being rotated. Opening of the door 15 opens valve 21 so that a supply of the required amount of aqueous surfactant solution is introduced into the casing 10 from the reservoir 20 through the valve 21, and pipe 22, so as to coat the beads with the solution.

The bead discharge door 15 and valve 21 are then closed and the valve 25 is opened for a short time to admit dry cement, amounting to approximately one third of the total cement required for the concrete mix, from the hopper 23, thus coating the wet beads as they are rotated around the casing 10 by the rotor 11.

After a predetermined time delay, the valve 25 is re-opened and the conveyor 27 is actuated to admit the remainder of the cement and sand or aggregate required for the concrete mix, while valve 29 is opened to admit the required amount of water through pipe 28.

After a further predetermined time delay, when the mixing has been completed, the concrete mix is removed through outlet 30 by the opening of discharge door 31.

The quantity of expanded polystyrene beads used in the batch is preferably such as to constitute 30% to 80%, preferably 60% to 70%, by volume of the total concrete mix. The aqueous solution of surfactants preferably comprises 10% to 40% by weight of surfactant in water, with the proportion of cationic to non-ionic surfactants between 1:1 and 6:1. The cationic surfactant is preferably a substituted quaternary ammonium compound such a quaternised $C_{10}$ to $C_{18}$, preferably $C_{12}$ to $C_{14}$, alcohol. This appears to show a synergism with a non-ionic ethoxylated primary or secondary alcohol or a nonylphenolethylene oxide condensate having a hydrophilic-lipophilic balance of 11 to 16.

The surfactant mixture coats the expanded polystyrene beads and, with the further coating of dry cement, causes even distrubution of the beads in the concrete mix with the subsequent formation of a strong and uniform concrete of light weight.

In practice, the apparatus shown can be combined with apparatus of known type for producing the expanded polystyrene beads from polystyrene granules.

We claim:

1. A method of making lightweight concrete comprising the steps of coating expanded polystyrene beads with an aqueous surfactant solution containing both a substantive cationic surfactant and a non-ionic surfactant, coating the wet beads with dry cement, and then mixing the cement-coated beads with a further supply of cement, water and sand or aggregate to complete the concrete mix.

2. A method according to claim 1 wherein the aqueous surfactant solution is applied to the polystyrene beads as they fall from a hopper into a mixer.

3. A method according to claim 2 wherein the dry cement is applied to the wet polystyrene beads in the mixer, after completion of the application of surfactant solution.

4. A method according to claim 3 wherein the further supply of cement, water and sand or aggregate is introduced into the mixer after completion of the application of the dry cement to the beads.

5. A method according to claim 1 wherein the aqueous solution contains a total of from 10 to 40% by weight of surfactant.

6. A method according to claim 5 wherein the aqueous solution is applied in a proportion of from ½ to 2 liters per cubic meter of the total concrete mix.

7. A method according to claim 1 wherein the expanded polystyrene beads are mixed with the cement, water and sand or aggregate so as to constitute from 30 to 80% by volume of the total concrete mix.

8. A method according to claim 7 wherein the expanded polystyrene beads are mixed with the cement, water and sand or aggregate so as to constitute from 60 to 70% by volume of the total concrete mix.

9. A method according to claim 1 wherein the proportion of cationic to non-ionic surfactant in the aqueous solution is between 1:1 and 6:1.

10. A method according to claim 1 wherein the cationic surfactant is a substituted quaternary ammonium compound containing a $C_{10}$ to $C_{18}$ alkyl substituent.

11. A method according to claim 1 wherein the cationic surfactant is an ethoxylated quaternary ammonium compound containing a $C_{10}$ to $C_{18}$ alkyl substituent.

12. A method according to claim 10 or 11 wherein the $C_{10}$ to $C_{18}$ alkyl substituent is a predominantly saturated alcohol.

13. A method according to claim 12 wherein the alkyl substituent is a $C_{12}$ to $C_{14}$ alcohol.

14. A method according to claim 1 wherein the cationic surfactant is an ethoxylated primary or secondary amine having a $C_{10}$ to $C_{18}$ alkyl substituent.

15. A method according to claim 14 wherein the alkyl substituent is a predominantly saturated $C_{12}$ to $C_{14}$ alkyl group.

16. A method according to claim 1 wherein the non-ionic surfactant is an ethoxylated primary or secondary alcohol.

17. A method according to claim 1 wherein the non-ionic surfactant is a nonylphenol-ethylene oxide condensate.

18. A method according to claim 16 or 17 wherein the non-ionic surfactant as a hydrophilic-lipophilic balance of 11 to 16.

* * * * *